Figure 1:
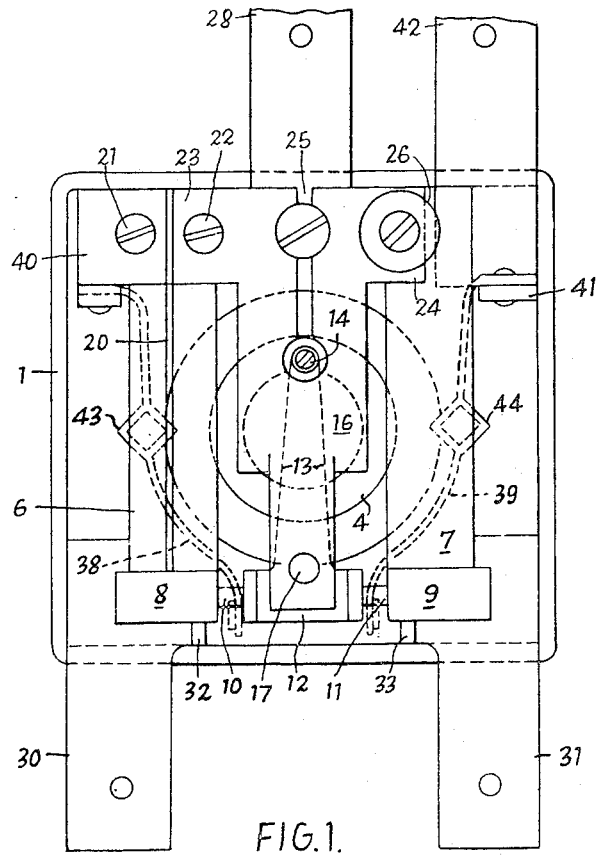

Dec. 6, 1955    N. R. DAVIS ET AL    2,726,300
ELECTRICAL ENERGY REGULATORS
Filed Nov. 7, 1951    5 Sheets-Sheet 1

INVENTORS

Dec. 6, 1955    N. R. DAVIS ET AL    2,726,300
ELECTRICAL ENERGY REGULATORS

Filed Nov. 7, 1951    5 Sheets-Sheet 3

INVENTORS
*Nevill Ryland Davis*
*James Newton Wetherill*
By *their Attorneys*
ATTORNEYS

United States Patent Office 2,726,300
Patented Dec. 6, 1955

2,726,300

ELECTRICAL ENERGY REGULATORS

Neville Ryland Davis, London, and James Newton Wetherilt, Laleham-on-Thames, England, assignors to Sunvic Controls Limited, London, England, a British company Application November 7, 1951, Serial No. 255,284

Claims priority, application Great Britain November 16, 1950

17 Claims. (Cl. 200—139)

This invention relates to electrical energy regulators such as are adapted for use with electric cookers, ovens and the like and more particularly to energy regulators for electric hotplates or boiling plates, that is to say electric heating devices of the kind which are adapted to heat by radiation or conduction cooking or like utensils located on, under or above the device. The invention, moreover, relates specifically to such energy regulators of the character described and claimed in British Letters Patent No. 517,538. The present invention has for its object to provide an advantageous arrangement of energy regulator of the character referred to.

According to the present invention, in an electrical regulator of the character referred to, the thermally responsive device and the means for compensating the operation of the regulator for variations of ambient temperature are arranged in response to variation in temperature to displace a floating lever or the equivalent element, and the switch has operative connection with a point of said floating lever or element which receives displacement differentially in accordance with the displacements of the thermally responsive device and the compensating means. The adjusting means are arranged so that the point in the movement of the thermally responsive device at which the switch contacts are operated is variable according to the setting of the regulator. The thermally responsive device and the compensating means conveniently each comprise a bimetal strip and will for convenience be referred to hereinafter as bimetal strips, although it will be understood that in its broader aspects the invention is not limited in this respect.

In a preferred arrangement the floating lever is connected at its ends with the movable points of the two bimetal strips and the displacement of the central or another intermediate point of the lever is arranged to operate the switch contacts.

In carrying out the invention the two bimetal strips may be disposed in various ways, but according to a preferred arrangement the strips are disposed with their major transverse axes lying in a single plane, or substantially so, the strips deflecting out of said plane with change of temperature. The strips are conveniently disposed parallel or substantially parallel with one another, and may conveniently be of cantilever form, that is to say are secured to an insulating or other base block or member of the regulator at one end, whilst their free ends are connected with the floating lever or the equivalent.

According to a further feature of the invention, adjustment of the setting of the regulator is provided for by a second floating lever or element, conveniently formed integrally with the first floating element, different points of which second element are operatively connected, respectively, with the centre or other point of said first floating element, with the switch, and with the adjusting means, the adjusting means determining the location of the one point of the second floating element in the plane of movement of the latter, so that the displacement of the centre or other point of the first floating element is transmitted through the second floating element to the switch contacts.

In a preferred arrangement the two floating levers are arranged integrally with one another in a single member of substantially triangular or T-shape, one side or the cross bar of said member engaging at its ends with the free ends of the bimetal strips and the trunk of the T extending between the two bimetal strips and parallel or substantially parallel with the latter.

According to a further feature of the invention, having for its object to provide a compact energy regulator, the energy regulator comprises a base member, a shaft or other rotary member journalled in said base member and adapted on the forward face of the base member to carry an adjusting knob or the like, a face cam made fast or formed integrally with said rotary member, two bimetal strips supported from the base member in a plane generally parallel with the major surface of said base member in rear of said cam, a floating member of generally triangular or T-form located between the free ends of said bimetal strips and extending between the latter, the free end of said floating member comprising an abutment engaging with the cam face and an intermediate point of said floating member carrying an abutment engaging with the snap-action switch. The snap-action switch is preferably supported from a metal member which extends in rear of the bimetal strips from the fixed end of the latter to the free ends thereof. Conveniently the snap-action switch is of the type described in British Letters Patent No. 419,917 or of the modified form set forth and claimed in British Letters Patent No. 585,972. Conveniently the base member projects locally to support bimetal strips and the snap-action switch.

According to a further feature of the invention, the snap-action switch means comprises a spring blade which is connected at one end with a metal member extending parallel with the two bimetal strips and which blade carries at its other end a moving contact adapted to engage with a fixed contact carried by the base block or equivalent. Where the switch is of the type according to British Letters Patent No. 419,917 or No. 585,972 aforesaid, the bowed portion or portions of the spring blade of the switch are received in a notch or notches provided in a downturned portion or portions of said member.

According to a further feature of the invention, one or more additional switches are provided in the regulator for isolating the latter and the load in the off position of the regulator, which further contacts are operated by suitable formation of the peripheral surface of the face cam.

The arrangement according to the invention possesses the advantage that the two bimetal strips (or equivalent) may be disposed so as to be in relatively poor thermal relation to one another whereby the heating applied to the first bimetal strip is efficiently utilised and consequently the power required for operation of the device may be reduced to a comparatively small value. The bimetal strip may readily be arranged so as to be directly heated by the passage of the main current through a series heater, or in some cases through the strip itself, thereby avoiding the use of a fine wire winding connected in parallel with the regulated apparatus. It will be understood, however, that the invention includes within its scope the use of such parallel winding. As a further consequence of the reduced power required for heating the bimetal strip the overall dimensions of the device and of a casing therefor may be made comparatively small without exceeding a satisfactory limit of temperature rise during operation. In addition the arrangements may readily be such, as will hereinafter appear, that the displacements of the various points of the floating element due to the displacements of the thermally responsive means, the temperature compensating means, and the adjusting means are greater than the opening movement of the switch contacts so that unavoidable variations in the dimensions of the various parts due to manufacturing tolerances and the effect of wear will be reduced in proportion to the magnification obtained between the movement of the switch contacts and the corresponding movements of the points of the floating element.

Two embodiments of energy regulator according to the invention will now be briefly described by way of example with reference to the accompanying drawings.

Figure 3:
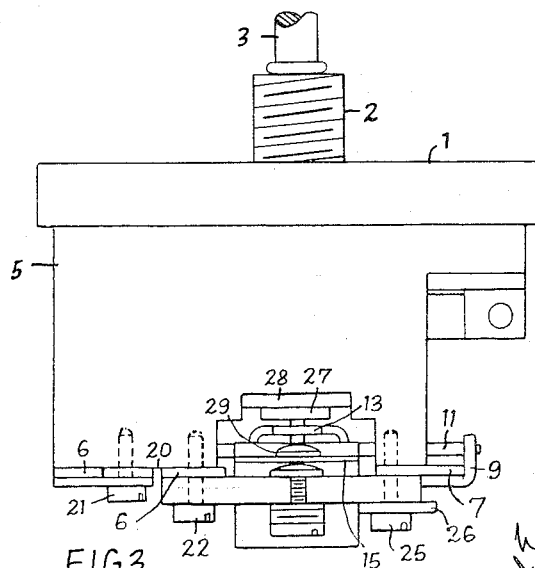
Figure 2:
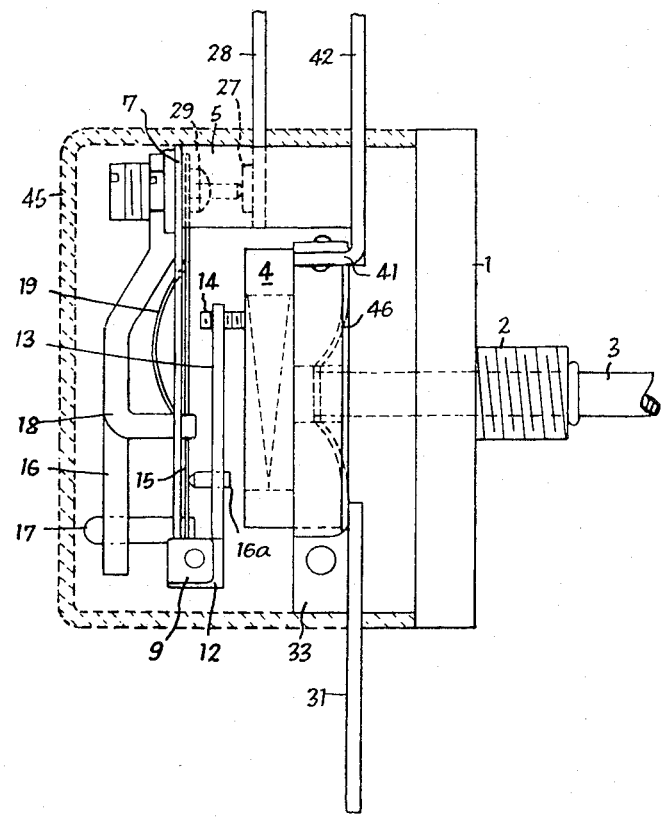
Figure 4:
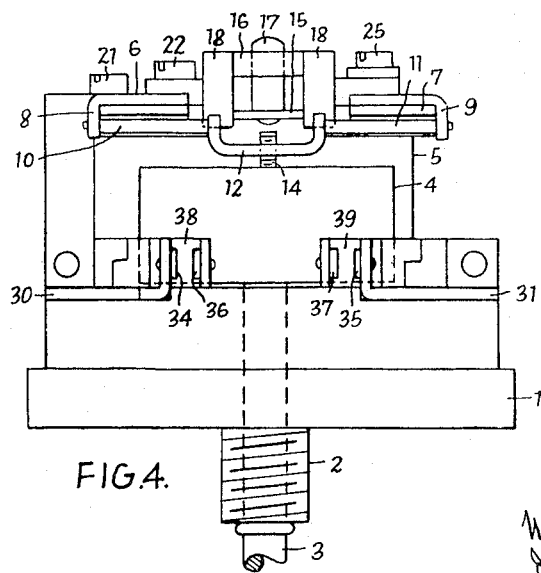
Figure 5:
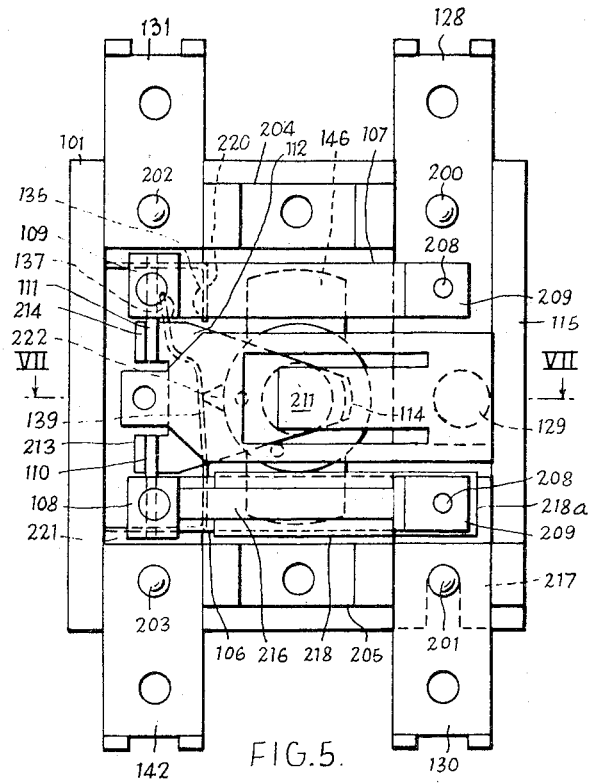
Figure 7:
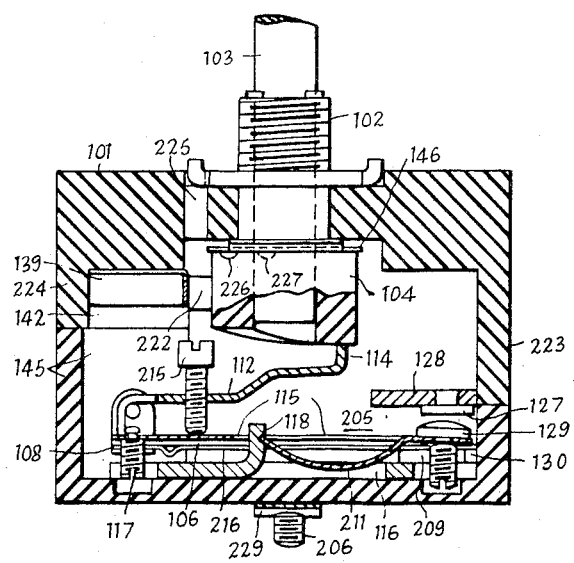
Figure 10:
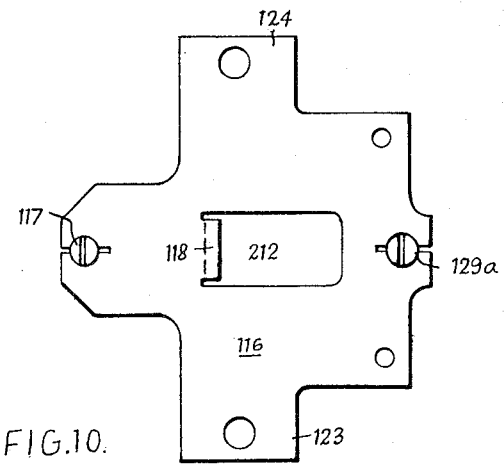
Figure 6:
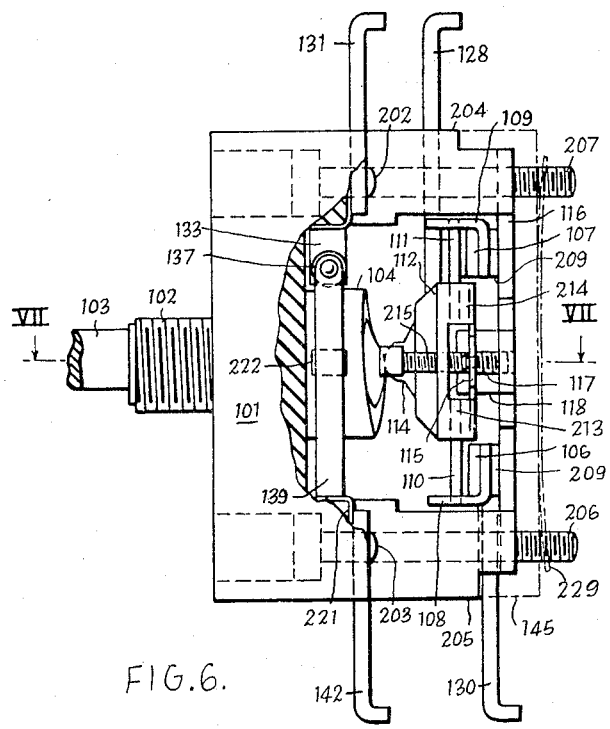
Figure 8:
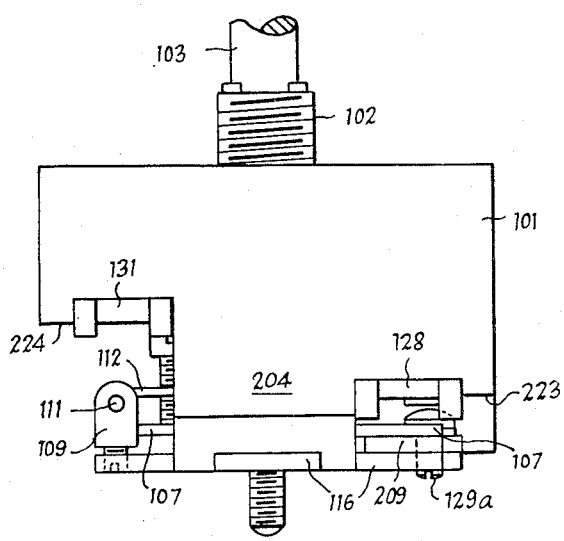
Figure 9:
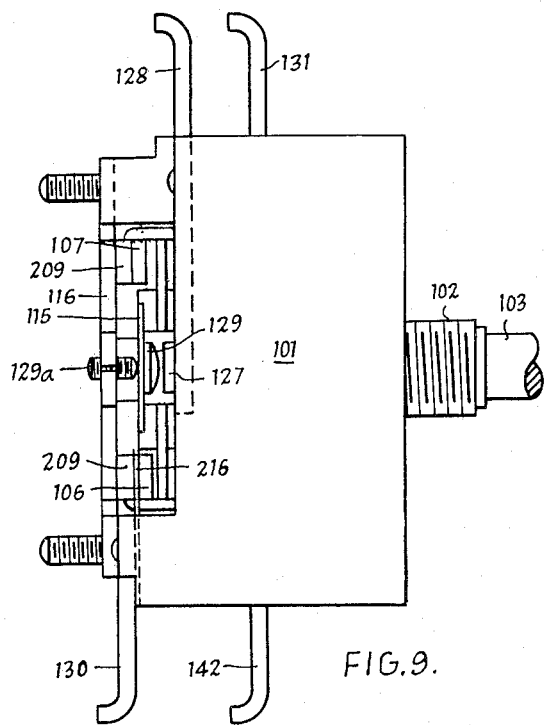

In the drawings,

Figs. 1 and 2 are respectively a rear elevation and a side elevation of one embodiment, Figs. 3 and 4 are respectively a plan view and an elevation from the under side of the regulator, Figs. 5 and 6 are respectively rear and side (partly fragmentary) elevations of another embodiment, Fig. 7 is a sectional plan taken on the lines VII—VII of Figs. 5 and 6, and Fig. 8 is a plan view;

Fig. 9 is the other side elevation, and Fig. 10 is an elevation of a detail of the construction.

Referring to Figs. 1 to 4, the regulator comprises a base block 1 of ceramic or other insulating material of generally square form having a central bore in which is located a bush 2 forming a bearing for an operating shaft 3 which carries, in rear of the base block, a cylindrical cam 4. The base block is provided to one side of the cam with a projection 5 extending rearwardly beyond the cam. Two bimetal strips 6 and 7 are secured to said projection. At their free ends the bimetal strips have welded, or otherwise secured thereto, bearing lugs 8 and 9 in which are received the outer ends of two rods 10 and 11 which are rigidly connected at their inner ends to upturned lugs of a T-shaped member 12, the two rods lying in line with one another. The trunk 13 of the T-shaped member extends past the axis of the shaft 3 and at its free end carries an abutment screw 14 engaged with the face of the cam, which face is of spiral form.

The snap-action switch comprises a trifurcated spring blade member 15 of the form described in British Patent No. 419,917. This spring blade is carried by a metal bracket 16 which at one end is secured to the projection 5 of the base block. At its free end the bracket 16 is provided with a perforation receiving a peg 17 to which the fixed end of the switch blade 15 is riveted. The bracket is provided with downturned lugs 18 receiving the two ends of the outer prongs 19 of the switch blade. The fixed end of the switch bracket is of cranked form so as to clear the bowed outer prongs of the spring blade in operation. The member 13 carries an insulated peg 16a engaging with the switch blade.

The bimetal strip 6 is cut longitudinally at 20, the cut extending from the fixed end nearly to the free end of the strip, which is secured to the projection 5 of the base block by two screws 21 and 22 extending through the separated parts of the strip. The bracket 16 is formed with laterally extending lugs 23 and 24 located respectively above the one part of the bimetal strip 6 and the corresponding part of the other bimetal strip 7. The strip 7 is clamped between the lug 24 and projection 5 by means of a screw 25 with an interposed insulating washer 26.

The fixed contact of the switch, appearing at 27 in Fig. 2, is mounted on a terminal strip 28 which is secured in an opening provided in the projection 5. The switch blade 15 extends into this opening and carries a moving contact 29. The plate 16 carries a screw 29a forming an adjustable back stop for the switch.

In the embodiment shown in the drawings, further switches are provided for isolating both sides of the load from the supply in the "off" position of the regulator. The line terminals comprise strips 30 and 31 which are located in recesses on the rear face of the base block 1. These strips are provided with lugs 32 and 33 carrying fixed contacts 34 and 35 with which co-operate moving contacts 36 and 37 carried respectively by spring blades 38 and 39 operated by the cam 4 in a manner hereinafter to be described. The spring blade 38 is clamped to the projection 5 of the base block by means of a connecting member 50 which serves also to clamp the one part of the bimetal strip 6 to said projection. The spring blade 39 is riveted to a lug 41 on a further terminal strip 42 also located in a recess on the rear face of the base block. The circuit thus proceeds from line terminal 30, contacts 34 and 36, spring blade 38, member 40, the two portions of the bimetal strip 6, bracket 16, moving contact 39, fixed contact 27 and terminal 28 to the load. From the load the circuit returns through terminal 42, switch blade 39, contacts 37 and 35, and terminal 31.

The spring blades 38 and 39 are crimped at 43 and 44 to provide V-shaped abutments co-operating with notches formed in the peripheral surface of the cam 40. The crimping is arranged so that the inwardly projecting abutment on the blade 38 is located adjacent the edge of the blade 31 adjacent the base block 1, whilst that on the blade 39 is located adjacent the edge of said latter blade remote from the base block. The notches referred to in the cam are located at different distances from the base block so as to co-operate respectively with the two blades, whereby only in the "off" position of the cam will all the abutments be received in said notches and in all other positions of the cam the contacts 36 and 37 will be moved into engagement with the fixed contacts 34 and 35 respectively. It will be understood that the spring blades 38 and 39 are provided with an initial set so as to be urged toward the cam member.

The parts of the regulator may be enclosed in an insulating casing 45 (Fig. 2) provided with suitable slots for accommodating the four terminal strips.

In the operation of the regulator above described, the bimetal strips are arranged to flex away from the base block with increase of temperature. In the "off" position the cam positions the abutment 14 in the illustrated position, that is to say in its furthest position away from the base block. The abutment 16a then holds the contact 29 out of engagement with the contact 27. When the cam is displaced to an operative position, the abutment 14 is allowed under the force of the spring blade 15 to move toward the base block 1 so that the contacts 29 and 27 close. Current then flows to the load and in flowing through the bimetal 6 causes the temperature of the latter to rise so that the free end of the bimetal strip 6 will move away from the base block 1 and cause opening of the switch, the floating lever comprising the rods 10 and 11 and member 12 pivoting about the lug 9. The load is therefore de-energised and the cessation of current through the bimetal 6 causes the latter to cool down and again move toward the base block and reclose the switch. This cycle continues. It will be clear that the temperature to which the bimetal must be raised in order to cause opening of the contacts 29 and 27 will depend upon the position of the abutment 14 and therefore upon the angular position of the cam which therefore controls the percentage "on" time. Variations in ambient temperature affect both the bimetal strips 6 and 7 causing movement of the latter in opposite directions to one another so that the centre point of the floating lever will suffer no appreciable movement toward or away from the base block 1 whereby the ambient temperature compensation is provided.

Conveniently the cam surface is formed so as to provide continuous energisation of the load when the cam has been actuated to a position somewhat less than one complete revolution from the "off" position, so that the rotation of the cam can then be continued directly to the "off" position, the cam surface causing the abutment 14 to move rapidly from the position nearest the base block 1 to the illustrated position. The arrangement is such that the contacts 36 and 37 will be engaged with the contacts 34 and 35 respectively before the contact 29 engages the contact 27 and will be opened after the last-mentioned contacts are opened, whereby the final making and closing of the circuit is effected at the snap-action contacts 29 and 27.

A friction spring blade 46 may be provided for producing a desired stiffness of the operating shaft 3 to guard against inadvertent displacement of the latter.

It will be seen that displacement of the moving contact 29 is effected by the bimetal strip 8 causing rotational movement of the member 12 and its associated rods 10 and 11 about an axis joining the screw 14 and the point at which the rod 11 is journalled in the bracket 9, the rotational movement of the member 12 about said axis being imparted to the switch through the peg 16a at a smaller radius than that at which the rod 10 is journalled in the bracket 8. Similarly, movement of the compensating bimetal strip 7 causes rotational movement of the member 12 about an axis joining the screw 14 and the point at which the rod 10 is journalled in the bracket 8. Furthermore, movement of the switch contact as a result of rotation of the cam is effected by rotation of the member 12 about the axis of the rods 10 and 11, the radius at which the peg 16a moves as a result of this rotational movement being a fraction of the radius of movement about said axis of the screw 14. By this means a desirable accuracy of operation may be consistently maintained with reasonable manufacturing tolerances and in spite of effects of slight wear as may occur in service.

In the modified embodiment shown in Figs. 5–10, parts corresponding with the parts of the embodiment shown in Figs. 1–4 are indicated by reference numerals similar to those employed in Figs. 1–4, but with the addition of 100. It will therefore be unnecessary to describe in detail all the parts individually of Figs. 5–10, whilst the operation of the arrangement will also be clear from the description of Figs. 1–4.

In Figs. 5–10, the base block 1 of ceramic or other insulating material is again generally of square form with an operating shaft 103 located in a bush 102, the shaft carrying a cylindrical cam 104. Four terminal members 128, 130, 131 and 142 are again secured to the rear face of the block by means of screws 200—203; the terminal members are registered in place by being received in recesses in said rear face.

The bimetal strips 106 and 107, the snap-action switch and floating lever assembly are carried, in a manner hereinafter to be described in detail, by means of a flat plate 116 shown separately in Fig. 10 and omitted in the showing of Fig. 5. This plate is mounted on a pair of projections 204 and 205 extending rearwardly from the block. The plate is secured by means of screws 206 and 207.

The bimetal strips 106 and 107 are secured to the plate by rivets 208 with interposed packing members 209 spacing the strips from the plate so as to allow deformation of the strips. The fixed end of the switch blade 115 is anchored in a groove 210 formed in a screw 117 received in a threaded bore in the plate 116 whereby the snap-action of the switch may be adjusted. The plate carries the adjustable backstop 129a of the switch. In the embodiment shown in Figs. 5–10, the switch blade 115 is of the form described in British Letters Patent No. 585,972 comprising a central aperture containing a bowed tongue 211. The end of this bowed tongue remote from the contact 129 is received in a groove in a down-turned lug 118 pressed from the plate 116, an opening 212 (Fig. 10) being provided to accommodate the bowed tongue as can be most clearly seen from Fig. 7. The floating lever again comprises a generally T-shaped or triangular member 112 having secured thereto, such as by spot welding, a pair of pins 110 and 111 which are received in perforations in angle brackets 108 and 109 secured to the free ends of the bimetal strips 106 and 107. The floating lever is prevented from moving axially of the pins 110 and 111 by engagement of the bent-over ends 213 and 214 of the floating lever 112 with the inner edges of the bimetal strips as can be seen most clearly from Figs. 6 and 7. One end of the member 112 is turned over at 114 to form a cam follower engaging with the face of the cam 104. A screw 215 has screw-threaded engagement in the member 112 to engage the spring blade 115 of the switch.

The fixed contact 127 is carried by the terminal strip 129 forming one of the line terminals of the device. A strip 216 of suitably high resistance material forms a series heater for the bimetal strip 106. One end of the strip 216 is connected with the adjacent free end of said bimetal strip, whilst the other end of the heater strip is formed with a lateral lug 217 clamped beneath the terminal strip 130. The heater strip 216 is insulated from the bimetal strip 106 by means of a mica strip 218 and from the packing piece 209 by an interposed washer of mica. The circuit thus proceeds from terminal 128, by way of fixed contact 127, movable contact 129, switch blade 115, plate 116 and one rivet 208 to the free end of the bimetal strip 106, and continues through the heater strip 216 and lug 217 to the terminal 130.

Double-pole isolation of the load is obtained by means of the snap-action contacts 129 and 127 for one side of the load, namely between the line terminal 128 and the load terminal 130 and by means of an additional switch comprising a fixed contact 137 secured to a pressed metal bracket 220 clamped beneath the terminal member 131 in the recess in the latter, and a moving contact 137 carried by a spring blade 139 the end of which includes a bent-over lug 221 clamped beneath the terminal strip 142. The cam 104 carries a radial projection 222 for displacing the spring blade 139 to open the cotnacts in the off position of the shaft 103.

The base member is of generally box form comprising two side walls with which the projections 204 and 205 are integrally formed, a side wall 223 extending rearwardly to the rear plane of the terminal strip 128 and a side wall 224 extending rearwardly to the rear plane of the terminal strips 131 and 142.

It will be seen that, as in the embodiment of Figs. 1–4, the embodiment of Figs. 5–10 also provides for magnification between the cam and the contact movement, that is to say the cam movement is greater than the contact movement and similarly the movement of the bimetals is greater than that of the switch contacts.

The preset adjustment of the switch is provided by the abutment screw 215, access to which is obtained through a bore 225 in the base block; the arrangement is such that this adjustment takes place at the switch instead of at the cam so that the effect of adjusting the screw 225 is not magnified at the switch contacts by the magnifying effect just above referred to of the floating lever assembly. This arrangement has the advantage of reducing the space required axially of the operating shaft and furthermore does not interfere with the freedom of design of the operating geometry of the device.

The cam 104 is provided with a pair of depressions 226 and 227 on its forward face, these depressions being adapted to receive a hemispherical member riveted in the spring blade 146 and serving to provide an "accentuating" or detent effect for the fully "on" and "off" positions of the operating shaft.

The device is provided with an insulating cover 228 (Fig. 7) of such shape as to enclose completely the internal parts of the switch, this cover having surfaces engaging with the walls 204, 205, 223 and 224. It will be observed that with the cover in place the recesses which serve to register the terminal strips in place form also slots extending through the walls formed jointly by the base block and the cover. The cover may conveniently be located in place by a spring strip 229 (Fig. 7) pressed into engagement with the threads of the screws 207 and 208.

What we claim is:

1. An electrical energy regulator comprising first and second bimetal strips disposed with their major transverse axes lying substantially in a single plane and deflecting in opposite directions to one another out of said plane with change of temperature, a floating lever having its ends connected respectively with said bimetal strips to be displaceable in accordance with temperature changes of said strips, a switch contact connected with an intermediate point of said floating lever to receive displacements differentially in accordance with displacements of said bimetal strips, a co-operating switch contact, a heating circuit for said first strip, said circuit including said switch contacts, and a movable adjusting member operable to vary the point in the displacement of said first strip at which said contacts are operated.

2. An electrical energy regulator comprising first and second bimetal strips disposed substantially parallel with one another and with their major transverse axes lying substantially in a single plane and deflecting in opposite directions to one another out of said plane with change of temperature, a floating element having two points thereof connected respectively with said bimetal strips to be displaceable in accordance with temperature changes of said strips, a switch contact connected to a further point of said floating element to receive displacements differentially in accordance with displacement of said bimetal strips, a co-operating switch contact, a heating circuit for said first strip, said circuit including said switch contacts, and a movable adjusting member operable to vary the point in the displacement of said first strip at which said contacts are operated.

3. An electrical energy regulator comprising first and second bimetal strips of cantilever form disposed with their major transverse axes lying substantially in a single plane and deflecting in opposite directions to one another out of said plane with change of temperature, a floating element having two points thereof connected respectively with the free ends of said bimetal strips to be displaceable in accordance with temperature changes of said strips, a switch contact connected to a further point of said floating element to receive displacements differentially in accordance with displacement of said bimetal strip, a co-operating switch contact, a heating circuit for said first strip, said circuit including said switch contacts, and a movable adjusting member operable to vary the point in the displacement of said first strip at which said contacts are operated.

4. An electrical energy regulator comprising a base supporting first and second bimetal strips disposed with their major transverse axes lying substantially in a single plane and deflecting in opposite directions to one another out of said plane with change of temperature, a floating element having two points thereof connected with said strips, respectively, to be displaceable with temperature changes of said strips, a second floating element having one point thereof operatively connected with a further point of said first floating element to receive displacement differentially in accordance with displacements of said thermally responsive elements, a switch contact connected with another point of said second floating element, a co-operating switch contact, a heating circuit for said first strip, said circuit including the switch contacts, and a movable adjusting member mounted on said base and connected with a third point of said second floating element to determine the location of said third point in the plane of movement of said element.

5. An electrical energy regulator comprising a base supporting first and second bimetal strips of cantilever form disposed with their major transverse axes lying substantially in a single plane and deflecting in opposite directions to one another out of said plane with change of temperature, a floating element having two points thereof connected with said strips, respectively, to be displaceable with temperature changes of said strips, a second floating element having one point thereof operatively connected with a further point of said first floating element to receive displacement differentially in accordance with displacements of said strips, a switch contact connected with another point of said second floating element, a co-operating switch contact, a heating circuit for said first strip, said circuit including the switch contacts, and a movable adjusting member mounted on said base and connected with a third point of said second floating element to determine the location of said third point in the plane of movement of said element.

6. An electrical energy regulator comprising a base supporting first and second bimetal strips of cantilever form disposed substantially parallel with one another and deflecting in opposite directions to one another substantially perpendicularly to a common plane in response to change of temperature, a floating element having two points thereof connected with said strips, respectively to be displaceable with temperature changes of said strips, a second floating element having one point thereof operatively connected with a further point of said first floating element to receive displacement differentially in accordance with displacements of said strips, a switch contact connected with another point of said second floating element, a co-operating switch contact, a heating circuit for said first strip, said circuit including the switch contacts, and a movable adjusting member mounted on said base and connected with a third point of said second floating element to determine the location of said third point in the plane of movement of said element.

7. An electrical energy regulator comprising a base supporting first and second bimetal strips of cantilever form, disposed substantially parallel with one another and substantially in a single plane and deflecting in opposite directions to one another substantially perpendicularly to said plane in response to change of temperature, a floating element disposed substantially parallel with said plane and having two points thereof connected with the free ends of said first and second strips, respectively, to be displaceable with temperature changes of said strips, a switch contact connected with a third point of said floating element in triangular relation to said first two points, a co-operating switch contact, a heating circuit for said first thermally responsive element, said circuit including the switch contacts, and a movable adjusting member mounted on said base and connected with said floating element at a point thereof lying with said third point on a line substantially parallel with the two strips and intersecting a line joining said first two points.

8. An electrical energy regulator comprising a base member, a rotary member journalled in said base member, and adapted on the forward face of said member to carry an adjusting member, a face cam carried on said rotary member, first and second bimetal strips of cantilever form supported from the base member in a plane generally parallel with the major surface of said base member in rear of said cam and deflecting in opposite directions to one another substantially perpendicularly to said plane in response to temperature change, a floating element having two points thereof connected with the free ends of said strips, respectively, to be displaceable with temperature changes of said strips, an abutment on said floating element in triangular relation to said first two points, said abutment being displaceable by said cam, a switch contact connected with said floating element at a point intermediate said third point and a line joining said first two points, a co-operating switch contact, and a heating circuit for said first strip, said circuit including the switch contacts.

9. An electrical energy regulator comprising a base member, a rotary member journalled in said base member, a rotary member journalled in said base member, and adapted on the forward face of said member to carry an adjusting member, a face cam carried on said rotary member, first and second bimetal strips of cantilever form supported from the base member in a plane generally parallel with the major surface of said base member in rear of said cam, and deflecting in opposite directions to one another substantially perpendicularly to said plane in response to change of temperature, a floating element having two points thereof connected with the free ends of said strips, respectively, to be displaceable with temperature changes of said strips, an abutment on said floating element in triangular relation to said first two points, said abutment being displaceable by said cam, a switch contact carried by a snap-action spring member mounted on the base member and connected with said floating element at a point intermediate said third point and a line joining said first two points, a co-operating switch contact, and a heating circuit for said first strip, said circuit including the switch contacts.

10. An electrical energy regulator comprising a base member, a rotary member journalled in said base member, and adapted in the forward face of said member to carry an adjusting member, a face cam carried on said rotary member, first and second bimetal strips of cantilever form supported from the base member in a plane generally parallel with the major surface of said base member in rear of said cam and deflecting in opposite directions to one another substantially perpendicularly to said plane in response to change of temperature, a floating element having two points thereof connected with the free ends of said strips, respectively, to be displaceable with temperature changes of said strips, an abutment on said floating element in triangular relation to said first two points, said abutment being displaceable by said cam, a switch contact carried by a snap-action spring blade mounted on a metal member carried on the base member in rear of said bimetal strips and having at least one bowed portion received in a notch in a downturned portion of said metal member, said blade being connected with said floating element at a point intermediate said third point and a line joining said first two points, a co-operating switch contact, and a heating circuit for said first strip, said circuit including the switch contacts.

11. An electrical energy regulator comprising first and second bimetal strips of cantilever form disposed with their major transverse axes lying substantially in a single plane and deflecting in opposite directions to one another out of said plane with change of temperature, a floating element having two points thereof connected respectively with the free ends of said bimetal strips to be displaceable in accordance with temperature changes in said strips, a switch contact connected to a further point of said floating element to receive displacements differentially in accordance with displacement of said bimetal strip, a co-operating switch contact, a heating circuit for said first strip, said circuit including said switch contacts, a movable adjusting member operable to vary the point in the displacement of said first strip at which said contacts are operated, at least one further pair of co-operating switch contacts, two terminal members connected respectively with said further switch contacts, two further terminal members connected with one another by means of said first switch contacts, and, for one contact of each said pair of further switch contacts, operating means carried by said adjusting member to provide double-pole isolation of the load in the off position of the regulator.

12. An electrical energy regulator comprising a base member, a rotary member journalled in said base member, and adapted in the forward face of said member to carry an adjusting member, a face cam carried on said rotary member, first and second bimetal strips of cantilever form supported from the base member in a plane generally parallel with the major surface of said base member in rear of said cam and deflecting in opposite directions to one another substantially perpendicularly to said plane in response to temperature change, a floating element having two points thereof connected with the free ends of said strips, respectively, to be displaceable with temperature changes of said strips, an abutment on said floating element in triangular relation to said first two points, said abutment being displaceable by said cam, a switch contact connected with said floating element at a point intermediate said third point and a line joining said first two points, a co-operating switch contact, a heating circuit for said first strip, said circuit including the switch contact, at least one further pair of co-operating switch contacts, two terminal members connected respectively with said further switch contacts, two further terminal members connected with one another by means of said first switch contacts, and, for one contact of each said pair of further switch contacts, operating means carried by said adjusting member to provide double-pole isolation of the load in the off position of the regulator.

13. An electrical energy regulator comprising a base member, a rotary member journalled in said base member, and adapted in the forward face of said member to carry an adjusting member, a face cam carried on said rotary member, first and second bimetal strips of cantilever form supported from the base member in a plane generally parallel with the major surface of said base member in rear of said cam and deflecting in opposite directions to one another substantially perpendicularly to said plane in response to temperature change, a floating element having two points thereof connected with the free ends of said strips, respectively, to be displaceable with temperature changes of said strips, an abutment on said floating element in triangular relation to said first two points, said abutment being displaceable by said cam, a switch contact carried by a snap-action spring blade mounted on a metal member carried on the base member in rear of said bimetal strips and having at least one bowed portion received in a notch in a down-turned portion of said metal member, said blade being connected with said floating element at a point intermediate said third point and a line joining said first two points, a co-operating switch contact, a heating circuit for said first strip, said circuit including the switch contacts, at least one further pair of co-operating switch contacts, two terminal members connected respectively with said further switch contacts, two further terminal members connected with one another by means of said first switch contacts, and, for one contact of each said pair of further switch contacts, operating means carried by said adjusting member to provide double-pole isolation of the load in the off position of the regulator.

14. An electrical energy regulator comprising a base member, a rotary member journalled in said base member and adapted on the forward face of said member to carry an adjusting member, a face cam carried on said rotary member, first and second bimetal strips of the cantilever form supported from the base member in a plane generally parallel with the major surface of said base member in rear of said cam and deflecting in opposite directions to one another substantially perpendicularly to said plane in response to temperature change, a floating element having two points thereof connected with the free ends of said strips, respectively, to be displaceable with temperature changes of said strips, an abutment on said floating element in triangular relation to said first two points, said abutment being displaceable by said cam, a switch contact connected with said floating element at a point intermediate said third point and a line joining said first two points, a co-operating switch contact, a heating circuit for said first strip, said heating circuit including said switch contacts, at least one further pair of co-operating switch contacts, at least one spring blade mounted on the rear face of the base member for flexure across said face and carrying at its free end one of said further contacts, two terminal members connected, respectively, with two of said further contacts, two further terminal members connected with one another by means of said first switch contacts, and a cam formation on the peripheral surface of said cam engageable with said spring blade to open and close said further contacts according to the angular setting of the cam, and thereby provide double-pole isolation of the load in the off position of the regulator.

15. An electrical energy regulator comprising a base member, a rotary member journalled in said base member and adapted on the forward face of said member to carry an adjusting member, a face cam carried on said rotary member, first and second bimetal strips of cantilever form supported from the base member in a plane generally parallel with the major surface of said base member in rear of said cam and deflecting in opposite directions to one another substantially perpendicularly to said plane in response to temperature change, a floating element having two points thereof connected with the free ends of said strips, respectively, to be displaceable with temperature changes of said strips, an adjustable abutment on said floating element in triangular relation to said first two points, said abutment being displaceable by said cam, a switch contact connected with said floating element at a point intermediate said third point and a line joining said first two points, a co-operating switch contact, and a heating circuit for said first strip, said circuit including the switch contacts.

16. An electrical energy regulator comprising a base member, a rotary member journalled in said base member and adapted in the forward face of said member to carry an adjusting member, a face cam carried on said rotary member, first and second bimetal strips of cantilever form supported from the base member in a plane generally parallel with the major surface of said base member in rear of said cam and deflecting in opposite directions to one another substantially perpendicularly to said plane in response to change of temperature, a floating element having two points thereof connected with the free ends of said strips, respectively, to be displaceable with temperature changes of said strips, an adjustable abutment on said floating element in triangular relation to said first two points, said abutment being displaceable by said cam, a switch contact carried by a snap-action spring blade mounted on a metal member carried on the base member in rear of said bimetal strip and having at least one bowed portion received in a notch in a down-turned portion of said metal member, said blade being connected with said floating element at a point intermediate said third point and a line joining said first two points, a co-operating switch contact, and a heating circuit for said first strip, said circuit including the switch contacts.

17. An electrical energy regulator comprising a base member, a rotary member journalled in said base member and adapted on the forward face of said member to carry an adjusting member, a face cam carried on said rotary member, first and second bimetal strips of cantilever form supported from the base member in a plane generally parallel with the major surface of said base member in rear of said cam and deflecting in opposite directions to one another substantially perpendicularly to said plane in response to temperature change, a floating element having two points thereof connected with the free ends of said strips, respectively, to be displaceable with temperature changes of said strips, an adjustable abutment on said floating element in triangular relation to said first two points, said abutment being displaceable by said cam, a switch contact connected with said floating element at a point intermediate said third point and a line joining said first two points, a co-operating switch contact, a heating circuit for said first strip, said heating circuit including said switch contacts, at least one further pair of co-operating switch contacts, at least one spring blade mounted on the rear face of the base member for flexure across said face and carrying at its free end one of said further contacts, two terminal members connected respectively with two of said further contacts, two further terminal members connected with one another by means of said first switch contacts, and a cam formation on the peripheral surface of said cam engageable with said spring blade to open and close said further contacts according to the angular setting of the cam, and thereby provide double-pole isolation of the load in the "off" position of the regulator.

References Cited in the file of this patent

UNITED STATES PATENTS

| 2,121,079 | Eskin | June 21, 1938 |
| 2,184,339 | Ettinger | Dec. 26, 1939 |
| 2,197,230 | Waddell | Apr. 16, 1940 |
| 2,493,294 | Kronmiller | Jan. 3, 1950 |
| 2,546,471 | Myers | Mar. 27, 1951 |
| 2,565,631 | Sander | Aug. 28, 1951 |